NOVEL UREA DERIVATIVES AND THEIR USE AS HERBICIDES

Masahiro Aya, Junichi Saito, Nobuo Fukazawa, Tatsuo Tamura, Kazuo Kurihara, and Norihisa Morishima, Tokyo, Japan, assignors to Bayer Aktiengesellschaft, Leverkusen, Germany
No Drawing. Filed June 28, 1972, Ser. No. 266,876
Claims priority, application Japan, June 30, 1971, 46/47,162
Int. Cl. C07d 27/04, 29/30, 41/04
U.S. Cl. 260—239 BF                    22 Claims

ABSTRACT OF THE DISCLOSURE

New urea compounds of the formula

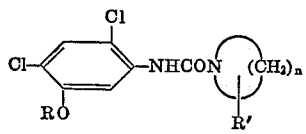

wherein
R is unsaturated lower alkyl, i.e., lower alkenyl of from 2 to 6, preferably 2 to 4, carbon atoms, or lower alkynyl of from 2 to 6, preferably 2 to 4, carbon atoms,
R' is hydrogen or methyl, and
n is 4, 5 or 6 are excellent herbicides, particularly selective herbicides usable in rice cultivation.

---

The present invention relates to certain new urea derivatives, to a process for their preparation and to their use as herbicides.

As non-hormonic herbicides, certain urea compounds are used in practice. In general, these urea compounds are so-called translocating herbicides, because the urea compounds are absorbed by the roots of plants and then translocate within the bodies of the plants to disturb their physiological functions so that the plants are killed.

The present invention provides, as new compounds, the urea derivatives of the general formula

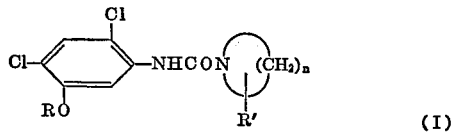

wherein
R is unsaturated lower alkyl, i.e., lower alkenyl of from to 6, preferably 2 to 4, carbon atoms, or lower alkynyl of from 2 to 6, preferably 2 to 4 carbon atoms,
R' is hydrogen or methyl, and
n is 4, 5 or 6.

Examples of R include vinyl, allyl, 2-methylpropenyl, but-1-enyl, but-2-enyl, buta-1,3-dienyl, pent-1-enyl, pentenyl, 3-methylbut-1-enyl, 2-methylbut-2-enyl, propynyl, propargyl, but-2-ynyl or but-3-ynyl.

The compounds of the Formula I have been found to be excellent herbicides and are suitable for the controlling of weeds, especially paddy-field weeds, for example Gramineae weeds, broad-leaved weeds and perennial weeds. Furthermore, these compounds exhibit high herbicidal activities against upland-field weeds when the soil of upland fields is treated with these compounds before the germination of such weeds.

These compounds, when used in appropriate amounts, exhibit selectively herbicidal properties, that is they do not show any phytotoxicity towards cultivated plants; in particular they do not show any phytotoxicity towards young rice plants. On the other hand, various known urea herbicides, for example, 3-(4'-chlorophenyl)-1,1-dimethyl-urea (Monuron), 3-(3',4'-dichlorophenyl)-1,1-dimethyl-urea (Diuron), 3 - (3',4' - dichlorophenyl) - 1 - butyl-1-methy-urea (Neburon) and 3-(3',4'-dichlorophenyl)-1-methoxy-1-methyl-urea (Linuron) do not have these properties.

The present invention also provides a process for the preparation of a compound of the Formula I above, in which (a) a substituted phenyl isocyanate of the general formula

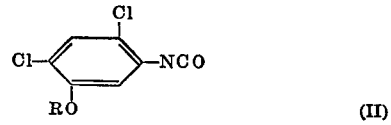

is reacted with an imine of the general formula

or (b) a substituted aniline of the general formula

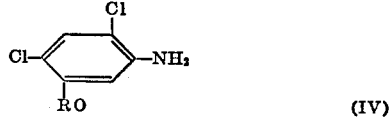

is reacted with a carbamoyl chloride of the general formula

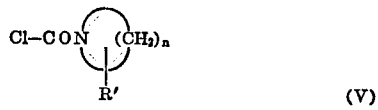

in which formulas,
R, R' and n have the meanings stated above for Formula I.

The process of the present invention may be represented by the following equations (in which R, R' and n have the meanings stated above):

Variant (a)

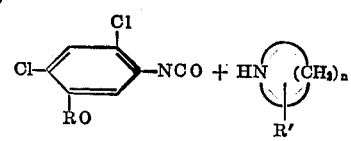

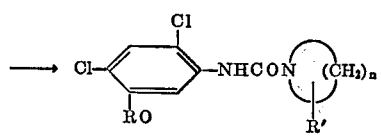

Variant (b)

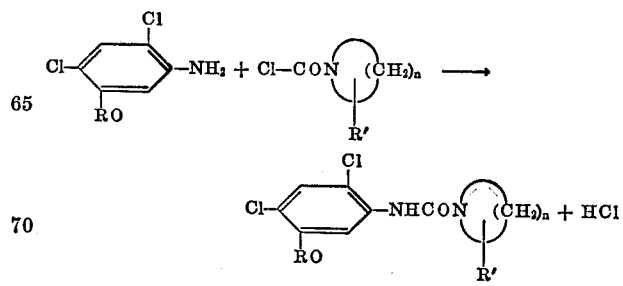

Examples of the substituted phenyl isocyanates of the Formula II are:

2,4-dichloro-5-vinyloxy-phenylisocyanate,
2,4-dichloro-5-allyl-oxy-phenyl isocyanate,
2,4-dichloro-5-(2'-methylpropenyloxy)-phenyl isocyanate,
2,4-dichloro-5-but-1'-enyloxy-phenyl isocyanate,
2,4-dichloro-5-but-2'-enyloxy-phenyl isocyanate,
2,4-dichloro-5-buta-1',3'-dienyloxy-phenyl isocyanate,
2,4-dichloro-5-pent-1'-enyloxy-phenyl isocyanate,
2,4-dichloro-5-pent-2'-enyloxy-phenyl isocyanate,
2,4-dichloro-5-(3'-methylbut-1'-enloxy)-phenyl isocyanate,
2,4-dichloro-5-(2'-methylbut-2'-enyloxy)-phenyl isocyanate,
2,4-dichloro-5-(2'-methylbut-2'-enyloxy)-phenyl isocyanate,
2,4-dichloro-5-propynyloxy-phenyl isocyanate,
2,4-dichloro-5-proparglyoxy-phenyl isocyanate,
2,4-dichloro-5-but-2'-ynyloxy-phenyl isocyanate, and
2,4-dichloro-5-but-3'-ynyloxy-phenyl isocyanate.

Examples of the imines of the Formula III are: pyrrolidine, piperidine, 2-methyl-piperidine, 3-methyl-piperidine, 4-methyl-piperidine, and N,N-hexamethylene-imine.

Examples of the substituted anilines of the Formula IV are:

2,4-dichloro-5-vinyloxy-aniline,
2,4-dichloro-5-allyloxy-aniline,
2,4-dichloro-5-(2'-methylpropenyloxy)-aniline,
2,4-dichloro-5-but-1'-enyloxy-aniline,
2,4-dichloro-5-but-2'-enyloxy-aniline,
2,4-dichloro-5-buta-1',3'-dienyloxy-aniline,
2,4-dichloro-5-pent-1'-enyloxy-aniline,
2,4-dichloro-5-(3'-methylbut-1'-enyloxy)-aniline,
2,4-dichloro-5-(2'-methylbut-2'-enyloxy)-aniline,
2,4-dichloro-5-propynyloxy-aniline,
2,4-dichloro-5-propargyloxy-aniline,
2,4-dichloro-5-but-2'-ynyloxy-aniline, and
2,4-dichlro-5-but-3'-ynyloxy-aniline.

Examples of the carbamoyl chlorides of the Formula V are: pyrrolidinyl-carbonyl chloride, piperidino-carbonyl chloride, 2-methyl-piperidino-carbonyl chloride, 3-methyl-piperidino-carbonyl chloride, 4 - methyl - piperidino-carbonyl chloride, and N,N-hexamethylene-imino-carbonyl chloride.

As a diluent in either of the foregoing process variants (a) and (b), there is preferably used an inert organic solvent, especially an aliphatic or aromatic hydrocarbon (which may be halogenated), such as benzine, methylene chloride, chloroform, carbon tetrachloride, benzene, chlorobenzene, toluene or xylene; an ether such as diethyl-ether, dibutylether, dioxane or tetrahydrofuran; ketone such as acetone, methyl ethyl ketone, methyl isopropyl ketone or methyl isobutyl ketone. A lower aliphatic nitrile such as acetonitrile or propionitrile can also be used.

The reaction temperatures for either process variant can be varied within a fairly wide range. Generally, the reaction is effected at a temperature of from —20° C. to the boiling point of the reaction mixture, preferably a temperature of from 0° to 100° C. or to the boiling point of the reaction mixture, whichever is the lower. The reaction is carried out preferably under normal pressure, although it can be effected under increased or reduced pressure.

If necessary, the reaction of process variant (b) can be effected in the presence of an acid-binding agent. For this purpose, use can be made of alkali metal carbonates and bicarbonates, such as sodium bicarbonate, potassium carbonate or sodium carbonate, alkali metal alcoholates, such as sodium or potassium methylate or ethylate, and aliphatic, aromatic or heterocyclic tertiary bases such as triethylamine, diethylaniline or pyridine.

The process of the present invention is illustrated in and by the following preparative examples.

EXAMPLE 1

Preparation of N-(2,4-dichloro-5-propargyloxy-phenyl-carbamoyl)-pyrrolidine

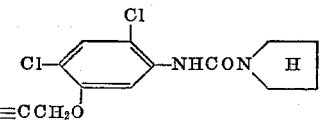

Compound (8)

24.2 g. (0.1 mole) of 2,4-dichloro-5-propargyloxyphenyl isocyanate were dissolved in 20 ml. of dioxane. To this solution, a solution of 7.2 (0.1 mole) of pyrrolidine in 20 ml. of dioxane was slowly and dropwise added. During this addition, the reaction mixture was maintained at 30° C. or lower, with stirring. After the completion of this addition, the resulting solution was stirred at room temperature for 1 hour and was then allowed to stand overnight.

To the liquid reaction mixture, cold water was added in an amount of 2–3 volumes per volume of the reaction mixture to precipitate a crystalline product. The crystalline product was isolated by means of filtration and was then dried. 30.3 g. of N-(2,4-dichloro-5-propargyloxy-phenyl-carbamoyl)-pyrrolidine were obtained. This compound is hereinafter identified as Compound No. 8. Yield: 97%. Melting point: 170–172° C.

EXAMPLE 2

N-(2,4-dichloro-5-propargyloxy-phenyl-carbamoyl)-piperidine

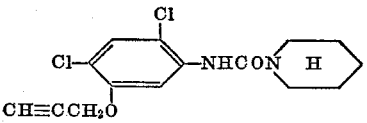

Compound (9)

12.1 g. (0.05 mole) of 2,4-dichloro-5-propargyloxy-phenyl isocyanate were dissolved in 15 ml. of diethyl ether. To this solution, a solution of 4.3 g. (0.05 mole) of piperidine in 10 ml. of diethyl ether was slowly added dropwise while the reaction mixture was maintained at 25° C. or lower, with stirring. After the completion of this addition, the reaction mixture was stirred at room temperature for 1 hour and was then allowed to stand overnight. The resulting solution was concentrated under reduced pressure and was then cooled to precipitate a crystalline product. This product was recrystallized from a mixture of benzene and n-hexane. 15.4 g. of N-(2,4-dichloro - 5 - propargyloxy-phenyl-carbamoyl)-piperidine were obtained. This compound is hereinafter identified as Compound No. 9. Yield: 94%. Melting point: 161–162° C.

EXAMPLE 3

N-(2,4-dichloro-5-propargyloxyphenyl-carbamoyl)-4-methyl-piperidine

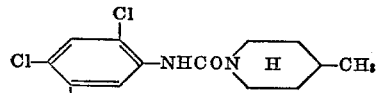

Compound (11)

12.1 g. (0.05 mole) of 2,4-dichloro-5-propargyloxy-phenyl isocyanate were dissolved in 20 ml. of n-hexane. To this solution, a solution of 5.0 g. (0.05 mole) of 4-methylpiperidine in 10 ml. of n-hexane was slowly added dropwise while the reaction mixture was maintained at 25° C. or lower, with stirring. After the completion of this addition, the reaction mixture was stirred at room temperature for 1 hour and was then allowed to stand overnight. The liquid reaction mixture was cooled to form a crystalline product. This product was separated by means of filtration and dried. 15.7 g. of N-(2,4-dichloro - 5 - propargyloxy - phenyl - carbamoyl)-4-methyl-piperidine were obtained. This compound is hereinafter identified as Compound No. 11. Yield: 95%. Melting point: 125–126° C. Compounds that were prepared according to methods analogous to those above are listed in Table 1.

TABLE 1

| Compound No. | Structural formula | Physical constant M.P. (° C.) |
|---|---|---|
| 1 | Cl-phenyl(Cl, OCH$_2$-CH=CH$_2$)-NHCON(piperidine, H) | 83–88 |
| 2 | Cl-phenyl(Cl, OCH$_2$-CH=CH$_2$)-NHCON(hexahydroazepine, H) | 82–84 |
| 3 | Cl-phenyl(Cl, OCH$_2$-CH=CH$_2$)-NHCON(2-methylpiperidine, H) | 81–83 |
| 4 | Cl-phenyl(Cl, OCH$_2$-CH=CH$_2$)-NHCON(4-methylpiperidine, H) | 66–69 |
| 5 | Cl-phenyl(Cl, OCH$_2$-CH=CH$_2$)-NHCON(hexahydroazepine, H) | 66–69 |
| 6 | Cl-phenyl(Cl, OCH$_2$C(CH$_3$)=CH$_2$)-NHCON(piperidine, H) | 77–78 |
| 7 | Cl-phenyl(Cl, OCH$_2$C(CH$_3$)=CH$_2$)-NHCON(hexahydroazepine, H) | 86–87 |
| 8 | Cl-phenyl(Cl, OCH$_2$C≡CH)-NHCON(piperidine, H) | 170–172 |
| 9 | Cl-phenyl(Cl, OCH$_2$C≡CH)-NHCON(hexahydroazepine, H) | 161–162 |
| 10 | Cl-phenyl(Cl, OCH$_2$C≡CH)-NHCON(2-methylpiperidine, H) | 129–130 |
| 11 | Cl-phenyl(Cl, OCH$_2$C≡CH)-NHCON(4-methylpiperidine, H) | 125–126 |
| 12 | Cl-phenyl(Cl, OCH$_2$C≡CH)-NHCON(hexahydroazepine, H) | 142–143 |

As noted above, the compounds of this invention are active herbicides. In general the present compounds show herbicidal activities for a long period. The type of activity of the instant compounds depends in part on the dosage applied. When the present compounds are used in large amounts (say from 3 to 20 kg./ha.), they will show non-selective herbicidal activities. When these compounds are used in small amounts (say from 0.5 to 3 kg./ha.), they will exhibit selective herbicidal activities. So, these compounds can be used as germination-inhibiting agents, particularly weed-killers. The term "weeds," as used herein, denotes all plants, in the broadest sense, growing in places where they are undesirable.

These compounds exhibit activities against weeds such as those listed below:

| Name of weeds—Dicotyledons: | Latin names |
|---|---|
| Catchweed | Galium. |
| Chickweed | Stellaria. |
| Chamomile | Matricaria. |
| Gallant soldier | Galinsoga. |
| Goosefoot | Chenopodium. |
| Annual nettle | Urtica. |
| Groundsel | Senecio. |
| Wild amaranth | Amaranthus. |
| Common purselane | Portulaca. |

| Name of weeds—Monocotyledons: | Latin names |
|---|---|
| Timothy | Phleum. |
| Bluegrass | Poa. |
| Fescue | Festuca. |
| Finger grass | Digitaria. |
| Goosegrass | Eleusine. |
| Foxtail | Setaria. |
| Cheat | Bromus. |
| Barnyard grass | Echinochloa. |

However, the present compounds, when used in proper amounts, do not exhibit any phytotoxicity towards cultivated plants such as those listed below:

| Name of plants—Dicotyledons: | Latin names |
|---|---|
| Mustard | Sinapis. |
| Cress | Lepidium. |
| Cotton | Gossypium. |
| Carrots | Daucus. |
| Beans | Phaseolus. |
| Potatoes | Solanum. |
| Coffee | Coffea. |
| Sugar beet | Beta. |
| Cabbage | Brassica. |
| Spinach | Spinacia. |

| Name of plants—Monocotyledons: | Latin names |
|---|---|
| Maize | Zea. |
| Rice | Oryza. |
| Oats | Avena. |
| Barley | Hordeum. |
| Wheat | Triticum. |
| Millet | Panicum. |
| Sugar cane | Saccharum. |

The plant species given above are to be understood as representative examples of the genus stated in Latin. The active compounds can be applied not only to these genera, but also to other similar plants.

The active compounds according to the present invention can be converted into the usual formulations, such as solutions, emulsions, suspensions, tablets, powders, pastes and granulates. These may be produced in known manner, for example by mixing the active compound with extenders, that is, liquid or solid or liquefied gaseous diluents or carriers, optionally with the use of surface-active agents, that is emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquified gaseous diluents or carriers are meant liquids which would be gaseous at normal temperatures and pressures, for example aerosol propellants, such as halogenated hydrocarbons, for example Freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulphonates, alkyl sulphates and aryl sulphonates; and preferred examples of dispersing agents include lignin, sulphite waste liquors and methyl cellulose.

Possible adjuvants include organic matter, stabilizers, adhesive agents, for example agricultural soap, calcium caseinate, sodium alginate, polyvinyl alcohol, detergents, coumarone (or indene) resins or polyvinyl butyl ether, combustible materials (for fumigants), for example zinc dust or dicyanidiamide, oxygen-yielding substances, for example perchlorates, nitrites or dichromates, phytotoxicity-reducing substances, for example zinc sulphate, ferrous chloride or copper nitrate, substances for prolonging the biological effects, for example chlorinated terphenyls, emulsion-stabilizing substances, for example casein, gum tragacanth and carboxymethyl cellulose (polyvinyl alcohol also being suitable for this purpose), and synergistic agents.

The formulations contain, in general, from 0.1 to 95%, preferably from 0.5 to 90%, by weight of active compound.

The compounds of the present invention can, if desired be applied with other agricultural chemicals such as insecticides, acaricides, nematocides, antiviral agents, herbicides, plant-growth regulators and attractants (which classes of materials include organophosphates, carbamates, dithio-(or thiol-)carbamates, chlorinated organic compounds, dinitro compounds, organosulphur or organometallic compounds, antibiotics, substituted diphenyl ethers, ureas and triazines) as well as with fertilizers.

The ready-to-use preparations (which may be prepared from suitable formulations by, for instance, dilution with water) may be applied in any usual manner, for instance, by spraying, such as liquid spraying, misting, atomizing, dusting, scattering, watering, pouring, fumigating, soil application, such as mixing, sprinkling, vaporizing and irrigating, and surface applications, such as painting, banding and dressing (dust-coating).

The amount of the active compound in the ready-to-use preparations is generally from 0.0001–20% by weight, preferably 0.005–10% by weight. The quantity of the active ingredient can be varied according to the type of preparation used, the method, purpose, time and place of the application and the growth state of the weeds to be controlled.

The compounds of the present invention may be also used in accordance with the well-known ultra-low-volume (ULV) process. According to this method, it is possible to use a concentration of the active ingredient of up to 95%, or even to apply the active compound alone.

The dosage per unit area is generally 3 to 1000 g., preferably 30 to 500 g., by weight of active compound per 10 ares. However, it is sometimes possible to increase or reduce the usual amount, and, in special cases, it may actually be necessary to do so.

The present invention also provides a herbicidal composition containing as active ingredient a compound of the present invention in admixture with a solid or liquified gaseous diluent or carrier or in admixture with a liquid diluent or carrier containing a surface-active agent.

The present invention also provides a method of combating weeds which comprises applying to the weeds or a weed habitat a compound of the present invention alone or in the form of a composition containing as active ingredient a compound of the present invention in admixture with a diluent or carrier.

The present invention further provides crops protected from damage by weeds by being grown in areas in which immediately prior to and/or during the time of the growing a compound of the present invention was applied alone or in admixture with a diluent or carrier. It will be seen that the usual methods of providing a harvested crop may be improved by the present invention.

The herbicidal activity of the compounds of this invention is illustrated by the following examples, in which the compounds of the invention are identified by numbers corresponding to those in Table 1, above.

EXAMPLE (I) (WETTABLE AGENT)

15 parts by weight of Compound No. 1, 80 parts by weight of a mixture or diatomaceous earth and kaolin (1:5) and 5 parts by weight of an emulsifier, a polyoxyethylene alkylaryl ether, were comminuted, mixed and then formulated into a wettable powder.

The so-prepared wettable powder was diluted with water before application by spraying.

EXAMPLE (II) (EMULSION)

30 parts by weight of Compound No. 8, 30 parts by weight of xylene, 30 parts by weight of methylnapthalene and 10 parts by weight of a polyoxyethylene alkylaryl ether were mixed and stirred to form an emulsifiable concentrate.

The so-prepared emulsifiable concentrate was diluted with water before application.

EXAMPLE (III) (POWDER)

2 parts by weight of Compound No. 3 and 98 parts by weight of a mixture or talc and clay (1:3) were comminuted and mixed to prepare a dusting powder.

EXAMPLE (IV) (POWDER)

1.5 parts by weight of Compound No. 5, 2 parts by weight of an organophosphate, 0.5 part by weight of isopropyl hydrogen phosphate and 96 parts by weight of a mixture of talc and clay (1:3) were comminuted and mixed to prepare a dusting powder.

EXAMPLE (V) (GRANULES)

A mixture of 10 parts by weight of Compound No. 9, 10 parts by weight of bentonite, 78 parts by weight of a mixture of talc and clay and 2 parts by weight of lignin sulphonate was well kneaded with 25 parts by weight of water, processed by means of an extrusion granulator to prepare granules of 20–40 mesh and dried at 40 to 50° C. to obtain a granular formulation. The so-prepared granular formulation was applied by scattering.

EXAMPLE (VI) (GRANULES)

95 parts by weight of clay particles having a particle size distribution of from 0.2 to 2 mm. were placed in a rotary mixer, and 5 parts by weight of Compound No. 10 dissolved in an organic solvent were sprayed thereon, while the mixer was rotating, to moisten the particles uniformly. The mixture was dried at 40 to 50° C. to obtain a granular formulation. The so-prepared granular formulation was applied by scattering.

EXAMPLE (VII) (OIL)

0.5 part by weight of Compound No. 11 of the present invention, 20 parts by weight of methylnaphthalene and 79.5 parts by weight of an odorless kerosene were mixed and stirred to prepare an oil formulation. The so-prepared oil formulation was applied by spraying.

The excellent herbicidal properties of the compounds of this invention are illustrated in and by the following test examples, in which the active compounds are identified by the numbers assigned to them in the preparative examples and in Table 1.

EXAMPLE A

Test against paddy-field weeds in water-applied pre-emergence treatment (pot test)

Preparation of active-compound formulation.—Carrier: 5 parts by weight of acetone or talc. Emulsifier: 1 part by weight of benzyloxypolyglycolether.

1 part by weight of the active compound and the above-mentioned amounts of the emulsifier and carrier were mixed and formulated into an emulsifiable concentrate or wettable powder. The mixture was diluted with water.

Test procedure.—Two rice-plant seedlings (Kinmaze variety) at the 3–4 leaves stage were transplanted in a Wagner pot of 1/5000 are, filled with paddy-field soil under irrigation conditions. After the seedlings had taken root, seeds of *Echinochloa crus-galli Cyperus microiria* and broad-leaved weeds were sown and *Eleocharis acicularis* was transplanted in the soil. Thereafter, the pot was irrigated to a depth of 6 cm. The active compound (in the form of the formulation above) was applied to the soil in a fixed quantity by means of a pipette. After the application the irrigation water was discharged for 2 days at a rate of 2–3 cm. per day, and then the irrigation was maintained at depth of about 3 cm.

After 4 weeks, the herbicidal effect and the phytotoxicity towards the sample rice plant were evaluated and classified on the following scales:

| Herbicidal effect— Scale numbers: | Herbicidal rate in comparison with untreated area |
| --- | --- |
| 5 | More than 95% (weeds dead). |
| 4 | More than 80%, up to 95%. |
| 3 | More than 50%, up to 80%. |
| 2 | More than 30%, up to 50%. |
| 1 | More than 10%, up to 30%. |
| 0 | 10% or less (virtually no effect). |

| Phytotoxicity—Scale numbers: | Phytotoxicity rate in comparison with untreated area |
| --- | --- |
| 5 | More than 90% (damage fatal to rice plant). |
| 4 | More than 50%, up to 90%. |
| 3 | More than 30%, up to 50%. |
| 2 | Less than 10%, up to 30%. |
| 1 | Less than 10%. |
| 0 | 0% (no phytotoxicity). |

The results are given in the following table:

TABLE A

Test results against paddy-field weeds in water-applied pre-emergence treatment (pot test)

| Compound No. | Amount of active ingredient (g./10 are) | Herbicidal effect | | | | Phytotoxicity, rice plant |
|---|---|---|---|---|---|---|
| | | Echinochloa crusgalli | Cyperus microiria | Eleocharis acicularis | Broad-leaved weeds [1] | |
| 1 | 300 | 5 | 5 | 5 | 5 | 0 |
| | 150 | 5 | 5 | 4 | 4-5 | 0 |
| | 75 | 5 | 4 | 3-4 | 3-4 | 0 |
| 2 | 300 | 5 | 4-5 | 5 | 5 | 0 |
| | 150 | 5 | 4 | 4 | 4 | 0 |
| | 75 | 5 | 3 | 3 | 3-4 | 0 |
| 3 | 300 | 5 | 5 | 5 | 5 | 0 |
| | 150 | 5 | 5 | 4 | 4-5 | 0 |
| | 75 | 4 | 4 | 3 | 3 | 0 |
| 4 | 300 | 5 | 5 | 5 | 5 | 0 |
| | 150 | 5 | 4 | 4 | 4 | 0 |
| | 75 | 5 | 3 | 3 | 3 | 0 |
| 5 | 300 | 5 | 5 | 5 | 5 | 0 |
| | 150 | 5 | 4 | 4 | 4 | 0 |
| | 75 | 4 | 4 | 3 | 3 | 0 |
| 6 | 300 | 5 | 5 | 5 | 5 | 0 |
| | 150 | 5 | 4 | 4-5 | 5 | 0 |
| | 75 | 4 | 4 | 4 | 4 | 0 |
| 7 | 300 | 5 | 5 | 4 | 5 | 0 |
| | 150 | 4 | 4 | 3-4 | 4 | 0 |
| | 75 | 3 | 3 | 3 | 3 | 0 |
| 8 | 300 | 5 | 5 | 5 | 5 | 0 |
| | 150 | 5 | 5 | 5 | 5 | 0 |
| | 75 | 5 | 5 | 5 | 5 | 0 |
| 9 | 300 | 5 | 5 | 5 | 5 | 0 |
| | 150 | 5 | 5 | 5 | 5 | 0 |
| | 75 | 5 | 5 | 5 | 5 | 0 |
| 10 | 300 | 5 | 5 | 5 | 5 | 0 |
| | 150 | 4-5 | 4-5 | 4 | 4 | 0 |
| | 75 | 4 | 4 | 4 | 3 | 0 |
| 11 | 300 | 5 | 5 | 5 | 5 | 0 |
| | 150 | 4 | 4 | 4 | 4-5 | 0 |
| | 75 | 3-4 | 3 | 3 | 3 | 0 |
| 12 | 300 | 5 | 5 | 5 | 5 | 0 |
| | 150 | 5 | 5 | 4 | 4 | 0 |
| | 75 | 4-5 | 5 | 3 | 3 | 0 |
| Nip [2] | 500 | 5 | 4 | 5 | 5 | 3 |
| | 250 | 5 | 2 | 5 | 5 | 1 |
| | 125 | 3 | 1 | 1 | 2 | 0 |
| Diuron [3] | 250 | 5 | 5 | 5 | 5 | 5 |
| | 125 | 5 | 5 | 4-5 | 5 | 5 |
| | 60 | 4-5 | 5 | 4 | 5 | 5 |
| No treatment | | 0 | 0 | 0 | 0 | 0 |

[1] The broad-leaved weeds were Monochoria vaginalis, Rotala indica and Lindernia pyxidaria
[2] Nip: 2,4-dichlorophenyl-4'-nitrophenyl-ether, a commercially available comparison.
[3] Diuron: 3-(3,4-dichlorophenyl)-1,1-dimethylurea, a commercially available comparison.

EXAMPLE B

Test against various plants with soil treatment

Test procedure—Seeds of the sample plant were sown in a pot (size 20 cm. by 30 cm.) and after 24 hours, a formulation (prepared as in Example A) was applied to the soil in an amount (calculated as active compound) of 5, 2.5, 1 or 0.5 kg./ha. 3 weeks after spraying, the degree of damage to the plants was evaluated and classified on the following scale:

Phytotoxicity:
0: no phytotoxicity
1: slight damage or slightly retarded growth
2: moderate damage or moderately retarded growth
3: heavy damage, the germination being only 50%
4: partial death of the plant after emergence; or an emergence rate of only 25%
5: death of plant or no emergence thereof.

The results of the test are shown in the following table.

TABLE B

Test results against various plants with soil treatment

| Active compound | Amount of active compound (kg./ha.) | Wheat | Barley | Rice | Cotton | Maize | Barnyard grass | Common purselane | Goosefoot | Chickweed | Wild amaranth | Finger grass |
|---|---|---|---|---|---|---|---|---|---|---|---|---|
| No. 8 | 5 | 3 | 3 | 2 | 1 | 3 | 5 | 5 | 5 | 5 | 5 | 5 |
| | 2.5 | 0 | 0 | 0 | 0 | 0 | 5 | 5 | 5 | 5 | 5 | 5 |
| | 1 | 0 | 0 | 0 | 0 | 0 | 5 | 5 | 5 | 5 | 5 | 5 |
| | 0.5 | 0 | 0 | 0 | 0 | 0 | 5 | 5 | 5 | 5 | 5 | 5 |
| Diuron* | 5 | 5 | 5 | 5 | 5 | 5 | 5 | 5 | 5 | 5 | 5 | 5 |
| | 2.5 | 5 | 5 | 5 | 5 | 4.5 | 5 | 5 | 5 | 5 | 5 | 5 |
| | 1 | 3 | 4-5 | 3 | 2 | 2 | 4 | 5 | 5 | 5 | 5 | 4 |
| | 0.5 | 2 | 2 | 2 | 2 | 1 | 3 | 4-5 | 4.5 | 4-5 | 4-5 | 3 |

*Defined as in Table A

What is claimed is:
1. Chlorinated phenyl urea compound of the formula

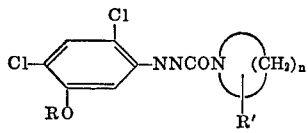

wherein

R is unsaturated lower alkenyl or alkynyl of from 2 to 6 carbon atoms,
R' is hydrogen or methyl, and
$n$ is 4, 5 or 6.

2. Compound as claimed in claim 1 wherein R is straight or branched alkenyl of from 2 to 6 carbon atoms.
3. Compound as claimed in claim 1 wherein R is straight or branched alkenyl of from 2 to 4 carbon atoms.
4. Compound as claimed in claim 1 wherein R is straight or branched alkynyl of from 2 to 6 carbon atoms.
5. Compound as claimed in claim 1 wherein R is straight or branched alkynyl of from 2 to 4 carbon atoms.
6. Compound as claimed in claim 1 wherein R' is hydrogen.
7. Compound as claimed in claim 1 wherein R' is methyl.
8. Compound as claimed in claim 1 wherein $n$ is 4.
9. Compound as claimed in claim 1 wherein $n$ is 5.
10. Compound as claimed in claim 1 wherein $n$ is 6.
11. Compound as claimed in claim 1 designated N-(2,4-dichloro - 5 - propargyloxy-phenyl-carbamoyl)-pyrrolidine.
12. Compound as claimed in claim 1 designated N-(2,4-dichloro - 5 - propargyloxy-phenylcarbamoyl)-piperidine.
13. Compound as claimed in claim 1 designated N-(2,4 - dichloro - 5 - propargyloxy - phenylcarbamoyl) - 4-methylpiperidine.
14. Compound as claimed in claim 1 designated N-(2,4-dichloro - 5 - allyloxy-phenylcarbamoyl)-pyrrolidine.
15. Compound as claimed in claim 1 designated N-(2,4-dichloro - 5 - allyloxy-phenylcarbamoyl)-piperidine.
16. Compound as claimed in claim 1 designated N-(2,4 - dichloro - 5 - allyloxy-phenylcarbamoyl)-3-methylpiperidine.
17. Compound as claimed in claim 1 designated N-(2,4-dichloro - 5 - allyloxy-phenylcarbamoyl)-4-methylpiperidine.
18. Compound as claimed in claim 1 designated N-(2,4-dichloro - 5 - allyloxy-phenylcarbamoyl)-hexahydroazepine.
19. Compound as claimed in claim 1 designated N-(2,4-dichloro-5-(2'-methyl - propen - 2 - yl - oxy)-phenylcarbamoyl)-piperidine.
20. Compound as claimed in claim 1 designated N-(2,4-dichloro-5-(2' - methylpropen - 2 - yl - oxy)-phenylcarbamoyl)-hexahydroazepine.
21. Compound as claimed in claim 1 designated N-(2,4 - dichloro - 5 - propargyloxy - phenylcarbamoyl)-3-methylpiperidine.
22. Compound as claimed in claim 1 designated N-(2,4-dichloro - 5 - propargyloxy-phenylcarbamoyl)-hexahydroazepine.

References Cited
FOREIGN PATENTS
1,925,112  1/1970  Germany  260—293.77

ALTON D. ROLLINS, Primary Examiner

U.S. Cl. X.R.
71—88, 94, 95; 260—293.77, 326.3, 453 A, 575